Oct. 15, 1940.    E. J. THURBER    2,218,442
SIGNALING AND ILLUMINATING MEANS FOR MOTOR VEHICLES
Filed Jan. 31, 1938    4 Sheets-Sheet 1

Inventor
EDWARD J. THURBER.

By Robbs Cobb
ATTORNEYS

Oct. 15, 1940.   E. J. THURBER   2,218,442
SIGNALING AND ILLUMINATING MEANS FOR MOTOR VEHICLES
Filed Jan. 31, 1938   4 Sheets-Sheet 2
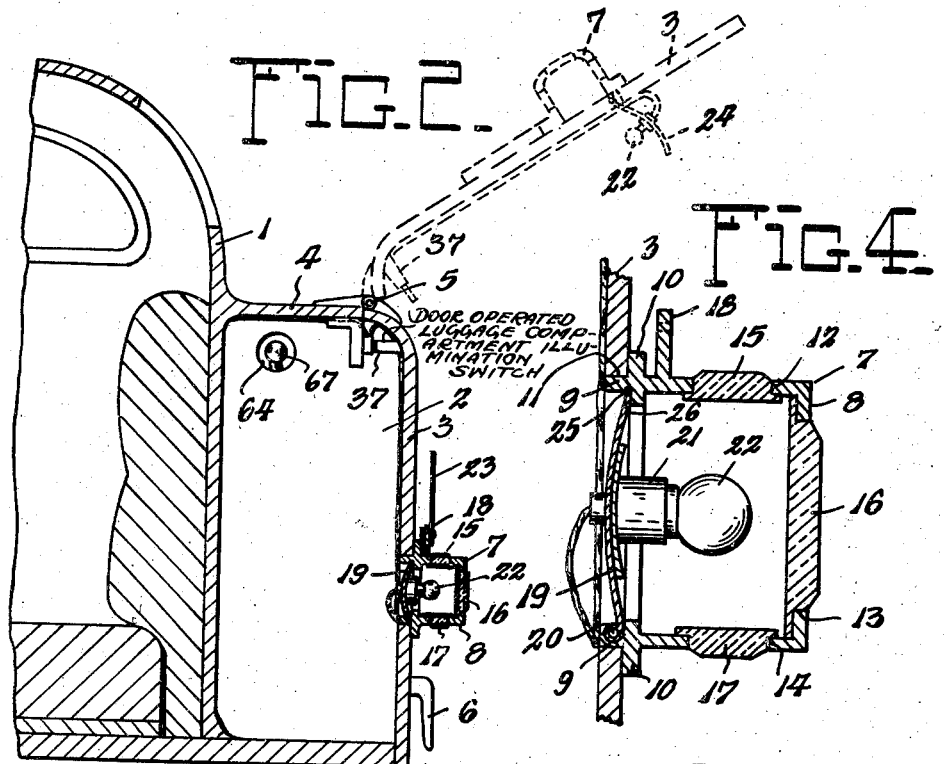
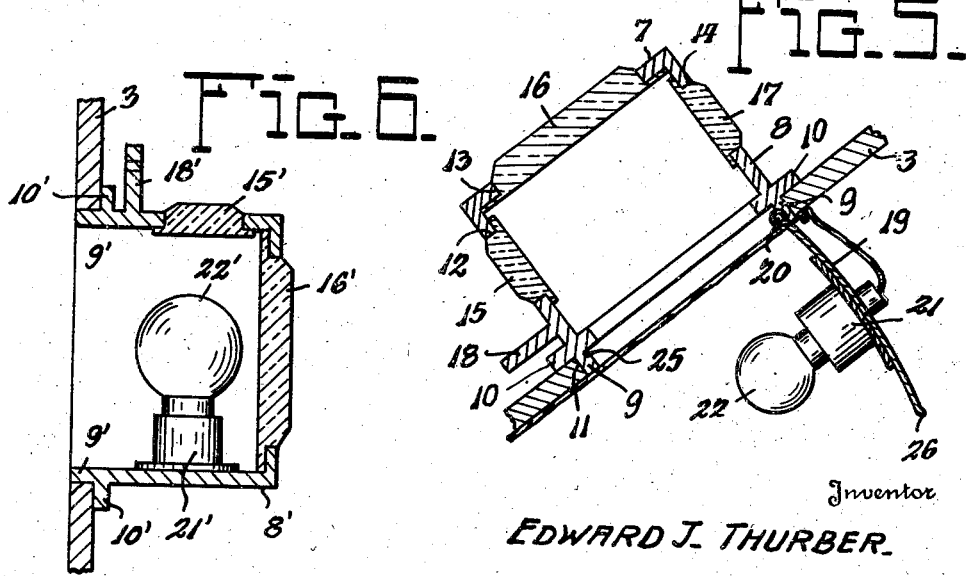
Inventor
EDWARD J. THURBER
By Robb & Robb
ATTORNEYS

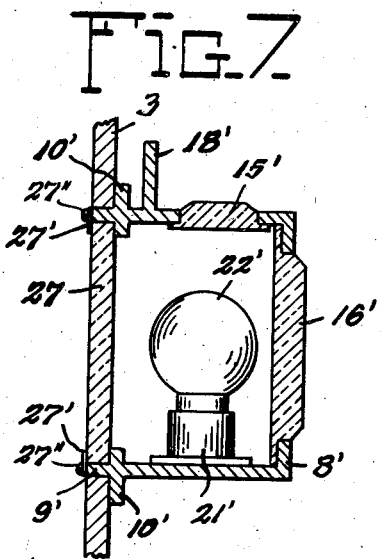
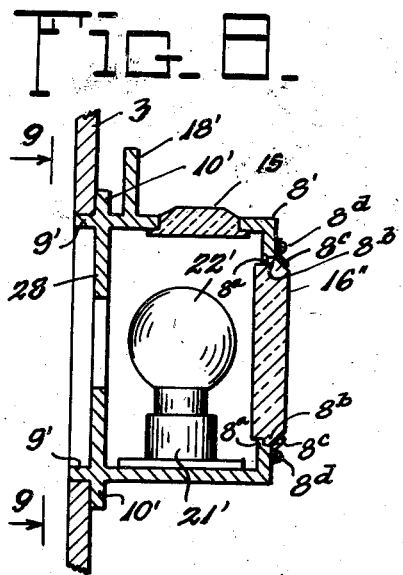
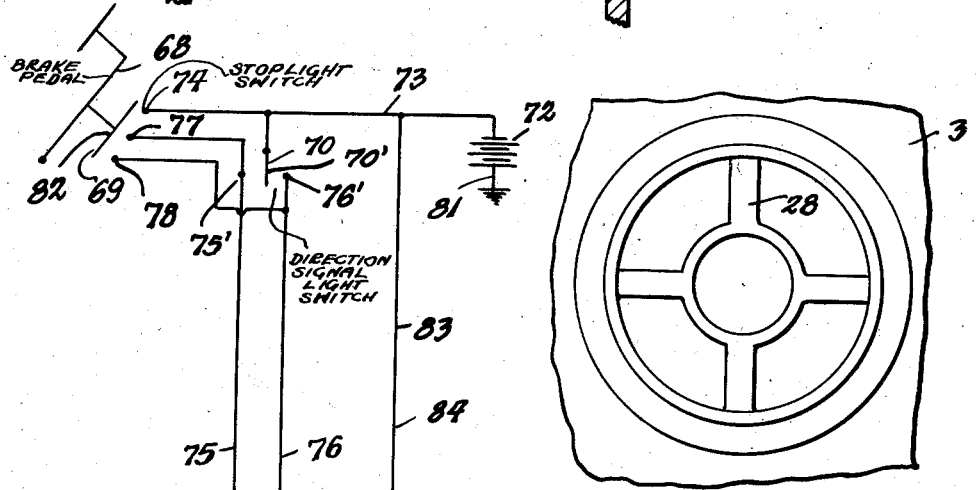
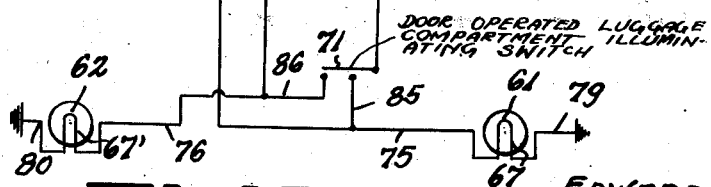

Oct. 15, 1940.   E. J. THURBER   2,218,442
SIGNALING AND ILLUMINATING MEANS FOR MOTOR VEHICLES
Filed Jan. 31, 1938   4 Sheets-Sheet 4
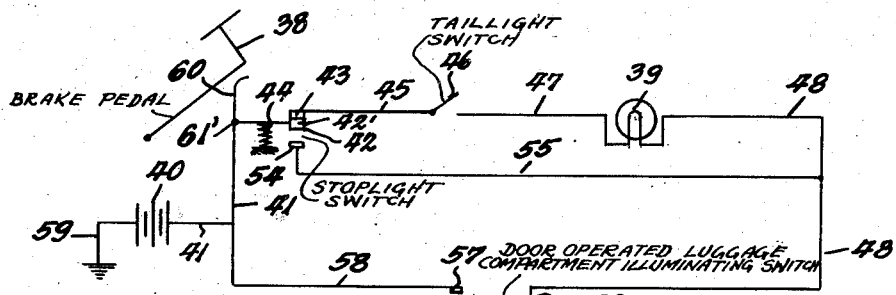
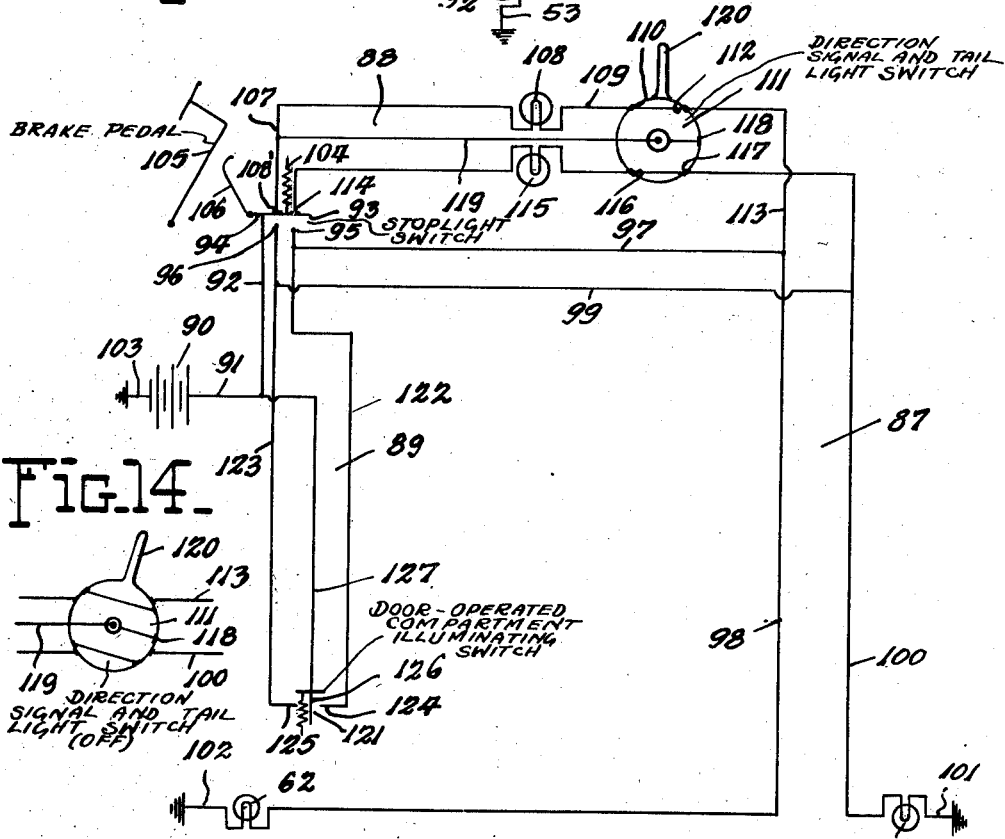
Inventor
EDWARD J. THURBER
By Robb & Robb
ATTORNEYS Patented Oct. 15, 1940

2,218,442

UNITED STATES PATENT OFFICE 2,218,442

SIGNALING AND ILLUMINATING MEANS FOR MOTOR VEHICLES

Edward John Thurber, New Orleans, La.

Application January 31, 1938, Serial No. 187,943

7 Claims. (Cl. 177—337)

The present invention appertains to signal and compartment illuminating systems for motor vehicles or the like.

Heretofore it has been the practice to provide motor vehicles with the usual danger and turn signals which derive their illumination from a separate source of light than that employed for illumination of interior compartment spaces of such vehicles. Illuminating systems have further been developed for illumination of danger signals, such as tail lights, of a construction so as to provide simultaneous illumination for the interior space of luggage compartments or the like, usually positioned at the rear of such vehicles. However, such combined signal and illuminating means have not proven satisfactory in view of the fact that the opening of the door of the luggage compartment obstructed the visibility of the signal lights.

It is, therefore, the object of the present invention to provide a signal and illuminating system of diversified function wherein single illuminating means for the various danger signals are employed which serve at the same time for effective illumination of the interior of a compartment space, such as the interior of a luggage compartment without curtailing their signaling function.

Another object of the present invention is the provision of a combined signal and compartment light structure, which employs a single source of light for illuminating the tail signal of a motor vehicle, while at the same time illumination of the license plate, the space in rear of the motor vehicle, and of a compartment space of the vehicle is effected.

Another object of the present invention resides in novel electric systems for operating such signal lights for various signaling purposes such as for direction indications and for signaling the stopping of the vehicle, besides their other function already referred to above.

A still further object of the present invention is the provision of control instrumentalities and special circuit arrangements for effecting operation of the combined signal and illuminating means in such a manner as to cause variations in the intensity of illumination of such signals to differentiate the same in respect to each other.

Further and other objects of the present invention will become more apparent from the following description and drawings, in which—

Figure 2 is a sectional view of the rear portion of a motor vehicle and the illuminating and signaling means as illustrated in Figure 1, certain parts being broken away.

Figure 4 is a sectional detail view of the combined compartment and tail light as illustrated in Figure 1.

Figure 5 is a view similar to Figure 4, illustrating, however, the door of the luggage compartment in an open position, the reflector of the combined tail and compartment light being shown in position for directing light into the interior of the compartment.

Figure 6 is a sectional view disclosing a modified structure of a combined tail light and compartment light.

Figure 7 is a view similar to Figure 6 showing still another modification of a tail light and compartment light construction provided with a transparent member for protecting the bulb mounted within the combined tail light and compartment light.

Figure 8 illustrates a combined tail light and compartment light structure with a grille member for protecting the electric bulb of the same.

Figure 9 is an elevational view of the combined tail light and compartment light structure, as illustrated in Figure 8, the view being taken in the direction of the arrows 9—9 of Figure 8.

Figure 10 illustrates an electric circuit for operating a plurality of direction indicating lights combined with means for effecting illumination of the interior space of a compartment such as a luggage compartment when the door of the latter is opened.

Figure 11 shows an electric wiring diagram for the combined tail light and compartment light of the present invention which permits the utilization of the tail light as stop light.

Figure 12 is an electric wiring diagram for direction indicating and stop lights which may be also used in accordance with the present invention for interior illumination of a luggage compartment or the like.

Figures 13 and 14 are diagrammatic views of the direction signal switch of Figure 12, showing different positions of the same.

Figure 1:
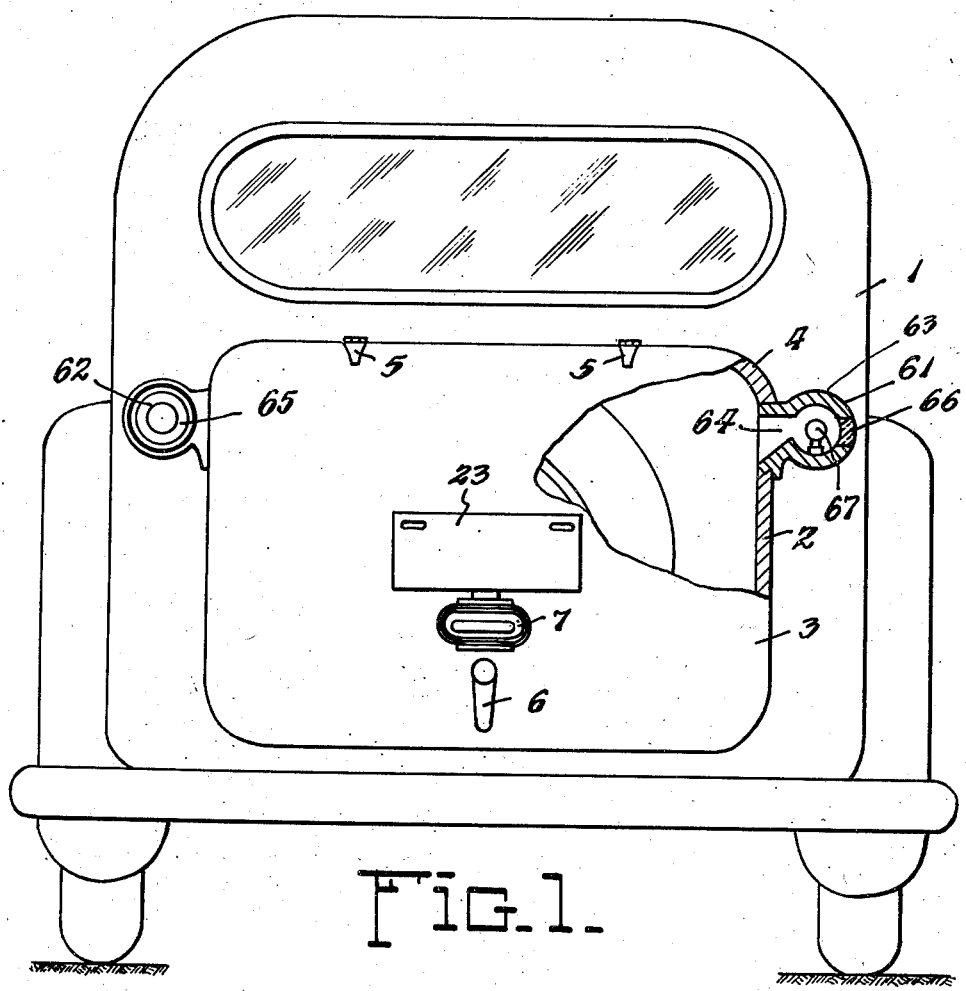
Figure 1 is a rear view of a motor vehicle having a compartment for the storage of luggage or the like which is provided with tail and signaling lights which serve also for interior illumination for said compartment.

Now referring to Figures 1 and 2, 1 indicates the body portion of a motor vehicle which is provided with a rear compartment 2 for the storage of luggage or the like. The rear compartment 2 is provided with a door 3 hingedly connected to the upper wall 4 of the luggage compartment 2 by means of a plurality of hinges 5. The door 3 of the luggage compartment 2 is provided with a handle 6 which also operates a lock mechanism for closing same. The lock mechanism may be of any conventional construction, and is not illustrated.

Mounted within the door 3 of the luggage compartment 2 is a combined tail light and compartment light structure generally indicated at 7, which comprises a housing 8 provided with flange portions 9 and 10. The flange portion 9 is adapted to be inserted into a corresponding opening 11 of the compartment door 3 and is secured to the latter in any convenient manner.

The housing or casing 8 of the combined tail light and compartment light structure 7 is further provided with a plurality of openings 12, 13 and 14, within which lenses 15, 16 and 17 are positioned and secured to the casing 8 in any desired manner. Adjacent to the lens 15 and forward of the same is an upstanding flange 18 which forms an integral part of the housing 8, providing a carrier member for license plates or the like attached thereto, in the usual manner.

Within the casing or housing 8 is mounted a reflector member 19 which is hinged to the casing at 20. The reflector member 19 is provided with a lamp socket 21 of usual construction which carries the electric bulb 22. The bulb 22 is so positioned within the casing 8 as to provide illumination for the license plate 23 through lens 15 while at the same time lens 17 permits illumination in back of the motor vehicle. Light passing through the lens 16 provides the usual tail light as commonly employed in motor vehicles today.

When the luggage compartment door 3 is opened to a position as shown in Figure 2, the reflector 19 of the combined tail light and compartment light 7 may be swung to a position as indicated at 24 in Figure 2, to provide illumination for the interior of the luggage compartment.

The flange portion 9 of the structure 7 is provided with a recess 25 adapted to cooperate with the end 26 of the reflector 19 so as to hold the same in closed position. For this purpose the free end 26 of the reflector 19 is, therefore, slightly resilient to snap into the recess or groove 25 when the reflector is moved to closed position.

Figure 6 illustrates a construction of a combined tail light and compartment light similar to that as shown in Figure 4. However, in this construction, the reflector 19 and lens 17 have been omitted and the socket 21' and electric bulb 22' have been mounted on the bottom portion of the casing 8'. In this form, the structure serves as a tail light and a compartment light, and also has the provision for the illumination of a license plate, or the like, mounted upon flange 18' and adjacent to lens 15'.

Figure 7 illustrates another modification of a combined tail light and compartment light structure, wherein a transparent plate 27 is mounted adjacent flange 9' and held in position thereto, by means of a retaining ring 27' secured to the flange 9' by means of screws 27". The transparent member 27 effectively prevents damage to the electric bulb 22'. Otherwise, the construction as shown in Figure 7 is the same as shown in Figure 6.

In Figures 8 and 9, the casing 8 of the combined tail light and compartment light structure is provided with a grille member 28 which may be preferably made integral with said casing structure. However, in such instance provisions must be made to permit the removal of lens 16" from the outside of casing 8', and to permit access to the electric bulb 22'. For this purpose the casing 8' at the opening adjacent lens 16" is provided with a shoulder 8a which cooperates with a corresponding shoulder 8b and a retention ring 8c for maintaining the lens 16" in its proper position in regard to the housing or casing 8'. The retention ring 8c is secured to the casing by means of screws 8d as will be obvious to those skilled in the art. Obviously, this construction offers the same advantages as referred to in regard to Figure 7, and effective protection of the electric bulb 22' is provided by means of the grille 28.

Figure 3:
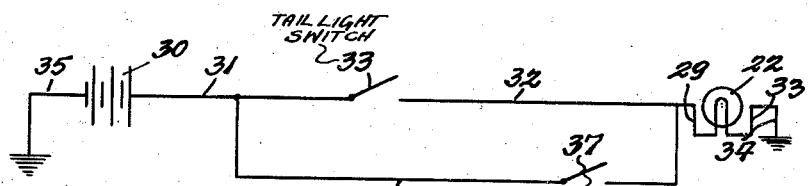
Figure 3 illustrates an electric wiring diagram for operating certain of the signaling and illuminating means as shown in Figure 1.

In Figure 3 there is illustrated a wiring diagram which shows the electrical connections for the combined tail light and compartment light above referred to. From this figure, it will be seen that one terminal 29 of the electric bulb 22 is connected with one of the terminals of the storage battery 30 of the motor vehicle by means of conductors 31 and 32 and interposed between the same is a switch 33 preferably mounted on the instrument panel of the motor vehicle. The other terminal 33' of the bulb 22 is connected to the frame of the motor vehicle by means of conductor 34, and likewise the other terminal of battery 30 is connected to the frame by means of conductor 35. A secondary circuit 36 interconnects conductors 31 and 32 and is provided with a compartment door switch 37, see also Figure 2, for rendering the secondary circuit 36 operative when the compartment door 2 is opened.

It will, therefore, be seen that upon opening of the compartment door 2, switch 37 is closed and current is supplied to electric bulb 22 so that the same will be illuminated to provide light for the interior space of the compartment 2. When the compartment door 3 is closed, switch 37 will be opened and the flow of electric current will thereby be interrupted. By closing the switch 33, current will be supplied to the electric bulb 22 which then functions as tail light and serves for illumination of the license plate and the space behind the motor vehicle.

Figure 11 illustrates a modified wiring diagram for the combined tail light and compartment light wherein provisions are made to permit the use of the tail light, as a compartment light and also as stop light to indicate stopping of the motor vehicle when the brake pedal 38 is applied to bring the vehicle to a stop.

The circuit arrangement of Figure 11 permits the operation of the bulb 22 as tail light when the light on the instrument panel 39 is in series with the same. In this instance, the electric light 22 will not receive the full voltage of six volts from the storage battery 40, and will, therefore, not be as brightly illuminated as when the full voltage is applied to the same, which will be the case when the light on the instrument board is disconnected from the circuit. In this way a difference of brightness of illumination of the tail light 22 is produced to indicate the stopping of the vehicle when the brake pedal 38 is applied. To accomplish this end, one terminal of the battery 40 is connected by a conductor 41 to a double pole switch 42 usually held in contact with contact member 43 by means of a spring 44. The contact member 43 is connected by means of a conductor 45 to one terminal of a switch 46 mounted on the instrument panel, while the other terminal of switch 46 is connected by means of conductor 47 to one terminal of the pilot light 39, also mounted on the instrument panel. The other terminal of the pilot light 39 is connected by means of conductor 48 with contact 49 of a compartment door switch 50.

Contact 51 of switch 50 is conductively connected by means of conductor 52 with one terminal of the light 22 while the other terminal of the light 22 is connected to the frame of the vehicle by means of conductor 53. The contact 54 of switch 42 is connected by means of conductor 55 to the conductor 48, thereby providing a secondary circuit for the operation of the electric bulb 22. The compartment door switch 50 comprises further the contact members 56 and 57. The contact member 56 is connected to the conductor 52, while the contact member 57 is connected to the conductor 41 by means of wire 58. The conductor 59 connects the other terminal of the battery 40 with the frame structure of the motor vehicle.

The operation of the circuit arrangement as shown in Figure 11 is as follows:

When it is desired to illuminate bulb 22 to serve as a tail light, switch 46 on the instrument panel is closed. The switch 42 is normally in a position as shown in Figure 11, and is held in this position by a spring 44. Likewise, switch 50, which is the compartment door switch, is normally in position as shown in this figure. It will, therefore, be seen that upon closing of the switch 46 as referred to above, the current will flow from the battery 40 through conductor 41, contact 42, contact 43, conductor 45, switch 46, conductor 47, instrument panel light 39, conductor 48, contacts 49—51, conductor 52, electric bulb 22, conductor 53 and over the frame of the motor vehicle to conductor 59, and back to the other terminal of the battery 40.

The light 39 on the instrument panel as well as the light 22 which functions now as a tail light will be illuminated. When the brakes of the vehicle are applied by operating brake pedal 38, the same will engage the upstanding portion 60 of switch 42 and cause turning of the switch 42 around its pivot 61'. The movable contact of switch 42 which may be designated as 42' is now brought into engagement with contact 54 and the electric current will flow from the battery through conductor 41, contacts 42 and 54, conductors 55, 48, contacts 49 and 51, through the electric bulb 22 without passing through light 39 on the instrument panel. The full voltage is now applied to the electric bulb 22 and the same will be considerably brighter illuminated than heretofore, and in this way by means of change of brightness of illumination a stop signal is given.

When the compartment door 3 is opened, contacts 56 and 57 of the compartment door switch 50 are closed, while contacts 49 and 51 are opened and current is supplied to the bulb 22 through conductors 41—58, contacts 57—56, and conductor 52 to cause operation of the same to illuminate the interior space of the luggage compartment.

The closing of this latter circuit for interior illumination of the luggage compartment is not dependent upon the operation of switch 46 or switch 42 and operation of electric bulb 22 is effected independently of the positions of the switch members 42 and 46.

From the above, it will, therefore, be seen that when the wiring system of Figure 11 is employed only a single light source is necessary, which serves as a tail light, license plate light, stop light and compartment light. This arrangement differs considerably from prior art systems in view of its simplicity and provides a very inexpensive and effective illumination system for the purposes as herein described.

Referring again to Figure 1, it will be seen that the luggage compartment 2 of the motor vehicle 1 is further provided with a plurality of direction signal lights generally indicated at 61 and 62. These directional signal lights are preferably mounted at both sides of the luggage compartment 2, as will be clearly seen from Figure 1, and comprise a housing 63, secured to the side wall of the luggage compartment 2 in any convenient manner as by welding or the like.

The housing 63 is in communication as shown at 64 with the interior of the luggage compartment 2, and is further provided with lenses 65 and 66. Mounted within the housing of the signal lights 62 and 61 is an electric bulb 67 positioned in such a manner as to provide illumination of the interior of the compartment space of the luggage compartment 2 as well as lenses 66 and 65.

Figure 10 shows a wiring diagram for the direction signal lights 61 and 62, which serve also, as already mentioned above, for illuminating the interior of the compartment space 2. These direction signal lights may be further operated incident to the operation of the brake pedal 68 as shown in Figure 10 for giving a stop signal if the brakes of the vehicle 1 are applied.

Figure 10 illustrates diagrammatically the wiring diagram for these signal lights and it will be noticed that the brake pedal 68 cooperates with a three-pole switch 69 for purposes as will be hereinafter specifically described.

70 illustrates a switch member mounted on the instrument panel of the motor vehicle and adapted to be manually operated to cause illumination of the direction or turn signals 61 and 62, while switch 71, which is of a construction similar to switch 37, is provided for cooperation with the compartment door 3 so as to cause operation of the electric bulbs 67 and 67' of the signal lights 61 and 62, upon opening of the compartment door 3 to a position as indicated in dotted lines in Figure 2 to thereby illuminate the interior space of the compartment 2.

Referring now more specifically to the wiring diagram in Figure 10, it will be noted that one of the terminals of the storage battery 72 is connected by means of conductors 73 with contact 74 of the three-pole switch 69.

While one contact of the electric bulbs 67 and 67' is connected by means of conductors 75 and 76 to contacts 77 and 78 respectively of the three-pole switch 69, the opposite contacts of the bulbs 67 and 67' are conductively connected by means of wires 79 and 80 to the frame of the motor vehicle, and likewise, the other terminal of the storage battery 72 is connected to the frame by means of conductor 81. It will, therefore, be seen that when the brake pedal 68 of the motor vehicle is depressed, and the brakes are applied, contact member 82 of the three-pole switch 69 will interconnect contacts 74—77 and 78 of the same, causing operation of the signal lights 61 and 62 which now function as stop indicating lights.

Interposed between conductors 75, 76 and 73 is the turn signal switch 70, which comprises contact members 76'—75' and 70'. If the driver of the vehicle desires to turn to the left, switch 70 is manually operated so as to connect the contacts 70' and 76' which will cause operation of the signal light 62 positioned at the left side of the luggage compartment 2 while a right turn of the motor vehicle may be indicated by the driver of the same manually by operation of switch 70 in a reverse direction from that described heretofore so as to connect contacts 70' and 75' which will cause signaling operation of the light 61.

A secondary circuit 83 which comprises a conductor 84 connected to conductor 73 and the conductors 85 and 86 permits operation of the lights 61 and 62 when switch 71 is closed. Switch 71, as already mentioned above, is operated by the compartment door 3 so as to establish contact between conductors 84, 85 and 86 when the compartment door is opened. The closing of the secondary circuit 83 to cause operation of the lights 61 and 62 for interior illumination of the compartment 2 is entirely independent of the operation of the remaining parts of the circuit.

It will, therefore, be seen that when the compartment door 3 is opened, the interior of the compartment 2 will be illuminated and at the same time lights 61 and 62 will function as danger lights for the purpose of warning on-coming traffic.

A further advantage in operating the signal lights 61 and 62 for purposes as herein described, resides in the fact that when the compartment door 3 of the luggage compartment 2 is opened, these lights are not obstructed by the door 3 and can be readily operated to warn on-coming traffic. On the other hand, when vehicle 1 is only provided with a combined tail light and compartment light 7, as shown in Figure 2, the door 3 of the compartment when in open position will obstruct the tail light 7 which in such case can not be seen from the rear of the vehicle even though the reflector 19 of the tail light has been opened.

Figure 12 illustrates diagrammatically another circuit system for operating the directional lights 61 and 62, as illustrated in Figure 1. The employment of the circuit of Figure 12 permits the utilization of lights 61 and 62 as tail lights, directional signal lights, stop lights, and compartment lights, in a very efficient and simple manner.

It will be seen that the electric wiring system of Figure 12 comprises, so to speak, three circuits, namely, the stop light circuit 87, the direction and tail light circuit 88, and the compartment light circuit 89. These three circuits are interconnected and cooperatively related to perform the various illuminating and signaling functions referred to above.

Referring to this illuminating system more specifically, and describing first the stop light circuit, it will be noted that the storage battery 90 of the motor vehicle is connected by means of conductors 91 and 92 to one terminal 93 of a brake pedal switch 94, while the contacts 95 and 96 of the brake pedal switch 94 are connected with the signal lights 61 and 62 by means of conductors 97, 98, and 99 and 100, respectively. The signal lights 61 and 62 are connected to the frame of the motor vehicle through conductors 101 and 102, while the opposite terminal 91 of the storage battery 90 is also connected with the frame of the motor vehicle by means of conductor 103.

The brake pedal switch 94 is normally held in the position as shown in Figure 12, by a spring 104, so that the contact blade 93 is normally held out of contact with switch contacts 95 and 96.

Upon operation of the brake pedal 105, switch arm 106 for the brake pedal switch 94 is operated to cause a downward movement of the switch blade 93 to thereby connect contacts 95 and 96 with the latter. This causes simultaneous closing of the two stop light circuits 97, 98 and 99, 100, effecting a bright illumination of signal lights 61 and 62, in view of the fact that the full voltage is applied to the signal lights, in a like manner, as already described in regard to Figure 10.

Operation of the brake pedal 105 will, therefore, effect the operation of signal lights 61 and 62 to warn following traffic that the brakes have been applied. The tail light and directional signal light circuit 88 comprises a conductor 107 connected to contact 108' of the brake pedal switch 94 and leading to one terminal of the instrument panel light 108, while the other terminal of the same is connected by means of conductor 109 to contact 110 of a directional and tail light switch 111. Contact 112 of the switch 111 is connected by conductor 113 to the conductor 98 leading to signal light 62.

In a like manner, contact 114 of the brake pedal switch 94 is connected with the instrument panel pilot light 115, contacts 116 and 117 of the switch 111, and conductor 100, which leads to the signal light 61.

Another contact 118 of the direction and tail light switch 111 is connected with conductor 107 by means of wire 119. Assuming now that the switch 111 is in a position as shown in Figure 12, in which it will be when it is set for night driving, current will be supplied to the signal lights 61 and 62 from the battery over the contacts 108' and 114 and conductors 98 and 100 respectively. The current will flow through the instrument panel lights 108 and 115 illuminating the same in addition to the illumination of the signal lights 61 and 62 as will be quite obvious from Figure 12.

The signal lights 61 and 62 will, therefore, be less brightly illuminated in view of the fact that a considerable amount of energy is consumed by the instrument panel lights 108 and 115, and the signal lights 61 and 62 will now function as tail lights.

If the driver desires to make a right turn and illuminate the directional light 61 located on the right rear side of the motor vehicle, switch 111 is rotated by manual operation of switch handle 120 to a position as shown in Figure 13, whereby contact 118 is connected with conductor 100 while all of the other remaining contacts of the switch 111 are moved to open position. It will, therefore, be seen that with the switch 111 in the position as shown in Figure 13, current will flow from the storage battery 90 over the brake pedal switch 94, contact 108', conductors 107—119, contact 118 of the direction and tail light switch 111, conductor 100, signal light 61, through conductor 101 to the chassis of the motor vehicle and back over the same and conductor 103 to the storage battery. The directional signal light 61 will be illuminated and warn the following traffic that the operator intends to make a right turn.

If a left turn indication is desired, switch 111 is manually operated in an opposite direction from that described above, so that the contact 118 of switch 111 will connect the conductor 113 and signal light 62 with the source of electric energy. In this instance, illumination of the left signal light 62 is effected, and a left turn signal is thereby given.

As mentioned above, switch 111 as shown in

Figure 12 is in its position as necessary for night driving so that with the exception of such times as when switch 111 is turned to positions operating the directional signal light 61 or 62, a continuous illumination of the signal lights 61 and 62, which function as tail lights, is established.

However, it should again be emphasized that with the switch in position as shown in Figure 12, the signal lights 61 and 62 when functioning as tail lights are not as brightly illuminated as when switch 111 is turned to positions to indicate either a left or right turn of the motor vehicle, at which instance the respective light at 61 or 62 will be illuminated much brighter because the instrument panel pilot lights 108 and 115 are at such time not in series with their respective directional signal lights 61 and 62. In this way, a distinctive characteristic of visibility between the signal lights when serving as tail lights or directional lights is attained.

During the day time, switch 111 is placed in a position as shown in Figure 14, wherein all contacts between this switch and its cooperating conductors are interrupted. In other words, with the switch in the position as shown in Figure 14, the instrument panel lights and the tail lights are turned off and only the operation of the brake pedal 105 and brake pedal switch 94 will effect operation of the signal light 61 and 62 to function as stop signal lights. If turn signals are to be given during the day time, switch 111 is moved from its position as shown in Figure 14, so as to bring its contact 118 in connection with conductor 113 or 100 to give either a left or right turn signal. When the signaling operation is completed, switch 111 is returned to its position, as shown in Figure 14.

A compartment switch 121 is further provided and cooperatively associated with the wiring diagram as shown in Figure 12, so as to cause illumination of the signal lights 61 and 62 upon opening of the compartment door 3 of the motor vehicle, at which instance, these signal lights function to illuminate the interior compartment space of the compartment 2, in the manner previously referred to more in detail herein.

For carrying out this function, contacts 95 and 96 of the brake pedal switch 94 are also connected by means of conductors 122 and 123 with the contacts 124 and 125 respectively of the compartment switch 121.

The third contact of the compartment switch 121, designated 126, is connected to conductor 91 by means of wire 127. The construction of the switch 121 is such that upon opening of the compartment door 3 of the motor vehicle, the contact 126 connects with contacts 124 and 125 to thereby close the circuits for the signal lights 61 and 62, which function now as compartment lights and provide also danger signals for on-coming traffic substantially in the same manner and for the purposes as set forth hereinbefore.

It will, therefore, be seen that when the compartment door 3 is opened and the switch 121 closes, current will flow from storage battery 90 over conductors 91, 127, contact 126 to contact 125, through conductors 123, 99, 100, to signal light 61, while the current will also flow from the contact 126 to conductor 124 and through conductors 122, 97, 98 to signal light 62. The other terminals of the signal lights 61 and 62 and the battery 90, are connected to the frame, and the return flow of the current takes place over the chassis frame as already previously mentioned.

It will, therefore, be seen that the opening of the compartment door 3 causes immediate illumination of the compartment and signal lights 61 and 62 substantially as set forth hereinbefore.

It should be noted further that while the stop signal circuit 87 and the directional and tail light circuit 88 are cooperatively interrelated, the operation of the brake pedal 105 will interrupt the flow of current to the directional and tail light circuit, and will apply full voltage to the signal lights 61 and 62 to function as stop lights. It is immaterial in which position the switch 111 may be at this time. In other words, the proper functioning of the stop lights is at all times obtained no matter in which way the remaining parts of the general circuit of the Figure 12 have been conditioned or operated.

From the above, it will, therefore, be observed that the circuit arrangement of Figure 12 permits a diversified operation of the signal lights 61 and 62 in a very simple manner, especially in view of the fact that only those two signal lights are necessary cooperating in such a manner as to permit the production of the various signaling effects, as described herein. The circuit is of a rather unique construction in that the brake pedal switch 94 is interposed between the direction and tail light circuit and the stop light circuit in such a manner as to connect or disconnect the instrument panel pilot lights with or from the signal lights 61 and 62. In other words, the switch 94 permits operation of two interrelated circuits of different voltage.

While reference has been made in the preceding description only to operation of the various circuits by means of a brake pedal and associated switch devices, it must be understood that any other operating means may be used in lieu of the brake pedals 105—38 or 68, such as an accelerator pedal or the like. Likewise, the signals to be given may be made dependent upon the acceleration or deceleration of the engine of the motor vehicle; or the operation of the various signals may be made dependent upon any other functions as will be obvious to those skilled in the art.

Having thus described my invention, what I claim as new and desire to secure by Letters Patent of the United States is:

1. In a signaling and illuminating system for motor vehicles having a control member operable incident to deceleration of the vehicle and having a rear luggage compartment including a door to open and close said compartment, a light fixture having a single electric light bulb, said fixture being fixed at the side of the vehicle adjacent to the luggage compartment and opening into the interior of the compartment for interior illumination of the compartment, said light fixture also serving as signaling means visible from the rear at least of the vehicle irrespective of the position of the luggage compartment door, a source of electrical potential, an electrical circuit operatively connecting the source of potential to the electric light bulb aforesaid, said electrical circuit including means controllable by the vehicle operator for energizing the light bulb with a distinctive characteristic of visibility to constitute a tail light and also at the same time constitute a luggage compartment illuminating light, and additional circuit means operable responsive to the control member of the vehicle independently of the first-mentioned means controllable by the operator for energizing the electric light bulb with a characteristic of visibility differing from the tail light to constitute a stop signal.

2. In a signaling and illuminating system for motor vehicles having a control member operable incident to deceleration of the vehicle and having a rear luggage compartment including a door to open and close said compartment, a pair of light fixtures each having a single electric light bulb, said fixtures being respectively fixed at the sides of the vehicle adjacent to the luggage compartment and opening into the interior of the compartment for interior illumination of the compartment, said light fixtures also serving as signaling means visible from the rear at least of the vehicle irrespective of the position of the luggage compartment door, a source of electrical potential, an electrical circuit operatively connecting the source of potential to each of the light bulbs aforesaid, said electrical circuit including means controllable by the vehicle operator for selectively energizing the individual light bulbs with one distinctive characteristic of visibilty to constitute direction signals, and said means being alternatively controllable by the vehicle operator for simultaneously energizing both light bulbs with another distinctive characteristic of visibility, differing from the direction signals, to constitute tail lights, and additional circuit means operable responsive to the control member of the vehicle independently of the means controllable by the operator for simultaneously energizing both of the light bulbs with a characteristic of visibility differing from the tail lights to constitute a stop signal.

3. In a signaling and illuminating system for motor vehicles having a control member operable incident to deceleration of the vehicle and having a rear luggage compartment including a door to open and close said compartment, a pair of light fixtures each having a single electric light bulb, said fixtures being respectively fixed at the sides of the vehicle adjacent to the luggage compartment and opening into the interior of the compartment for interior illumination of the compartment, said light fixtures also serving as signaling means visible from the rear at least of the vehicle irrespective of the position of the luggage compartment door, a source of electrical potential, an electrical circuit operatively connecting the source of potential to each of the lights bulbs aforesaid, said electrical circuit including means controllable by the vehicle operator for selectively energizing the individual light bulbs with one distinctive characteristic of visibility to constitute direction signals, and said means being alternatively controllable by the vehicle operator for simultaneously energizing both light bulbs with another distinctive characteristic of visibility, differing from the direction signals, to constitute tail lights, auxiliary circuit means operable responsive to opening of the luggage compartment door for energizing both light bulbs independently of the first-mentioned means controllable by the operator, whereby to illuminate the luggage compartment, and additional circuit means operable responsive to the control member of the vehicle for simultaneously energizing both of the light bulbs with a characteristic of visibility differing from the tail lights to constitute a stop signal.

4. In a signaling and illuminating system for motor vehicles having a control member operable incident to deceleration of the vehicle and having a rear luggage compartment including a door to open and close said compartment, a pair of light fixtures each having a single electric light bulb capable of emitting light of different intensities, said fixtures being respectively fixed to the vehicle at opposite sides thereof adjacent to the luggage compartment and opening into the interior of the compartment for interior illumination of the latter, said light fixtures also serving as signal means visible from the rear at least of the vehicle irrespective of the position of the luggage compartment door, a source of electrical potential, switch-controlled electrical circuit means operatively connecting the source of potential to each of the electric light bulbs of the light fixtures and operable to selectively energize the individual light bulbs as direction signals at a relatively high light intensity, and alternatively operable to simultaneously energize both light bulbs at relatively low light intensity as tail lights, auxiliary switch-controlled circuit means also connected to the source of potential and operable responsive to opening and closing of the luggage compartment door aforesaid for respectively energizing and deenergizing both light bulbs independently of the first-mentioned switch-controlled circuit means, and additional circuit means operable responsive to the control member of the vehicle for simultaneously energizing both light bulbs at relatively high light intensity as a stop signal.

5. In a signaling and illuminating system for motor vehicles having a control member operable incident to deceleration of the vehicle and having a rear luggage compartment including a door to open and close said compartment, a pair of light fixtures each having a single electric light bulb capable of emitting light of different intensities, said fixtures being respectively fixed to the vehicle at opposite sides thereof adjacent to the luggage compartment and opening into the interior of the compartment for interior illumination of the latter, said light fixtures also serving as signal means visible from the rear at least of the vehicle irrespective of the position of the luggage compartment door, a source of electrical potential, a pair of circuits connecting the source of potential to the respective light bulbs, each circuit of said pair of circuits including an element intermediate the source of potential and the light bulbs for reducing the potential at the light bulb, switch means accessible to the vehicle operator and interposed in said pair of circuits intermediate the elements aforesaid and the light bulbs, said switch means having one position establishing an operative circuit to both light bulbs through the potential reducing elements, thus energizing both light bulbs simultaneously at relatively low light intensity as tail lights, said switch means also having other positions selectively establishing an operative circuit to the respective light bulbs while excluding the potential reducing elements, thus selectively energizing the individual light bulbs at relatively high intensity as direction signals, auxiliary circuits having switch means operable responsive to opening and closing of the luggage compartment door for establishing an operative circuit from the source of potential to the respective light bulbs and serving to simultaneously energize both light bulbs, independently of the first-mentioned circuits and switch means, at relatively high light intensity, for compartment illumination, and additional switch means for controlling said auxiliary circuits responsive to the vehicle control member, whereby to energize both light bulbs simultaneously at relatively high light intensity as stop lights.

6. A system as claimed in claim 5, wherein the last-mentioned additional switch means is interposed between the source of potential and the first-mentioned pair of circuits and normally serves to establish a connection between the source of potential and the pair of circuits first-mentioned, and also serves to interrupt said connection when the vehicle control member is operated incident to deceleration of the vehicle.

7. In a signaling and illuminating system for motor vehicles having a rear luggage compartment including a door to open and close said compartment, a pair of light fixtures each having a single electric light bulb, said fixtures being respectively fixed at the sides of the vehicle adjacent to the luggage compartment and opening into the interior of the compartment for interior illumination of the compartment, said light fixtures also serving as signaling means visible from the rear at least of the vehicle irrespective of the position of the luggage compartment door, a source of electrical potential, an electrical circuit operatively connecting the source of potential to each of the light bulbs aforesaid, said electrical circuit including means controllable by the vehicle operator for selectively energizing the individual light bulbs with one distinctve characteristic of visibility to constitute direction signals, and said means being alternatively controllable by the vehicle operator for simultaneously energizing both light bulbs with another distinctive characteristic of visibility, differing from the direction signals, to constitute tail lights.

EDWARD JOHN THURBER.